Patented Oct. 28, 1952

2,615,919

UNITED STATES PATENT OFFICE 2,615,919

COLOR STABILIZED N,N'-DI-(SEC.-BUTYL)-P-PHENYLENEDIAMINE

Charles B. Biswell, Woodstown, N. J., assignor to E. I. du Pont de Nemours & Company, Wilmington, Del., a corporation of Delaware No Drawing. Application March 9, 1949, Serial No. 80,561

12 Claims. (Cl. 260—577)

This invention relates to N,N'-di-(sec.-butyl)-p-phenylenediamine which has been stabilized against deterioration and discoloration during storage.

N,N'-di-(sec.-butyl)-p-phenylenediamine is a particularly valuable and effective compound for inhibiting the formation of gum in cracked gasoline and inhibiting the deterioration and formation of deposits by tetraethyl lead contained in gasoline. However, the commercial N,N'-di-(sec.-butyl)-p-phenylenediamine has the objectionable fault of tending to deteriorate and to discolor badly during storage, particularly when exposed to air and light. Pure N,N'-di-(sec.-butyl)-p-phenylenediamine has a freezing point of 16° C., a melting point of 19° C. and a boiling range of 101 to 102° C. at 0.12 mm. and of 107° C. at 0.15 mm. mercury pressure and is a relatively stable compound. While N,N'-di-(sec.-butyl)-p-phenylenediamine may be made by various methods, the commercial product is generally made by a reductive alkylation process from p-nitroaniline, p-phenylenediamine, N-(sec.-butyl)-p-nitroaniline or N-(sec.-butyl)-p-phenylenediamine, and preferably from p-nitroaniline. Representative reductive alkylation processes are disclosed in Patents 2,323,948, 2,393,889 and 2,381,015. As disclosed in such patents, by-products, some of which are known, are obtained in the reaction mixture. The N,N'-di-(sec.-butyl)-p-phenylenediamine is separated from such mixture by filtration and vacuum distillation. However, the separated product still contains a small proportion of the by-products as impurities and it is practically impossible and commercially uneconomical to remove all of such impurities. Such impurities are generally unstable and form colored products and also tend to cause deterioration and discoloration of the N,N'-di-(sec.-butyl)-p-phenylenediamine, such deterioration and discoloration being accelerated by air and light. Accordingly, the commerial product has a high photosensitivity and rapidly develops a red color upon exposure to air and light. The red colored products have a high tinctorial power and, when the colored product is added to gasoline, interfere with the coloring of the gasoline since they conflict with the dyes used to designate the various grades of gasoline. Also, such deterioration and discoloration result in a decrease of the gum inhibitor efficiency of the product, decrease its solubility in the gasoline and result in deposits in the induction system of the engines in which the gasoline is employed.

It has been proposed to add gum inhibitors to gasoline and to also add certain amino compounds to prevent color formation by the gasoline or by the inhibitor contained therein. However, such color stabilizing amino compounds are generally ineffective to prevent the deterioration and discoloration of N,N'-di-(sec.-butyl)-p-phenylenediamine during storage before it is added to the gasoline. It has also been proposed to inhibit the deterioration and discoloration of N,N'-di-(sec.-butyl)-p-phenylenediamine by adding thereto an alkyl-aminophenol, such as butyl aminophenols. While such alkyl-aminophenols, and particularly the butyl aminophenols, have proved to be fairly effective, it is desirable to provide more effective materials for this purpose.

It is an object of the present invention to provide a composition consisting substantially of N,N'-di-(sec.-butyl)-p-phenylenediamine to which has been added a small amount of a compound which inhibits deterioration and color formation of the N,N'-di-(sec.-butyl)-p-phenylenediamine during storage. A particular object is to provide N,N'-di-(sec.-butyl)-p-phenylenediamine, which has been treated so that it has greatly improved color stability upon exposure to heat, light and oxygen. A further object is to provide compounds which are of unpredictable special utility in inhibiting color formation in N,N'-di-(sec.-butyl)-p-phenylenediamine which has been prepared by a reductive alkylation process. Another object is to provide N,N'-di-(sec.-butyl)-p-phenylenediamine which has been treated to render it particularly resistant to discoloration on exposure to heat, light and air and which produces less induction system deposits in engines operating on gasolines to which such composition has been added. Still further objects are to provide methods for treating N,N'-di-(sec.-butyl)-p-phenylenediamine to effectively inhibit deterioration and discoloration thereof during storage and upon exposure to heat, light and oxygen. Other objects are to provide new compositions of matter. Still other objects will appear hereinafter.

The above and other objects may be accomplished in accordance with my invention which comprises adding to N,N'-di-(sec.-butyl)-p-phenylenediamine, which has been made by a reductive alkylation process and which contains a small proportion of impurities formed in such process that normally tend to cause discoloration upon exposure to air and light, from about 0.2% to about 5% of a saturated heterocyclic imine containing a nucleus of the class consisting of pyrrolidine, piperidine, dipiperidyl, morpholine, thiamorpholine, piperazine and 1,3,5-dithiazine, and which imine, except for the nitrogen, oxygen and sulfur atoms that are members of the heterocyclic ring, consists of carbon and hydrogen atoms. The resulting composition consists substantially of N,N'-di-(sec.-butyl)-p-phenylenediamine and the saturated heterocyclic imine. Such composition has remarkable improved color stability during storage and upon exposure to heat, air and light. Thereby, the N,N'-di-(sec.-butyl)-p-phenylenediamine is so stabilized that it may be stored, shipped and otherwise handled in the ordinary manner without susbtantial deterioration or color formation prior to its introduction into gasoline. Such heterocyclic imines, however, have little or no effect to inhibit color formation of gasoline containing such N,N'-di-(sec.-butyl)-p-phenylenediamine or to inhibit color formation of such N,N'-di(sec.-butyl)-p-phenylenediamine when dissolved in gasoline as a gum inhibitor for such gasoline.

The heterocyclic imines which may be employed in accordance with my invention must contain a nucleus, or heterocyclic ring, such as is present in pyrrolidine, piperidine, dipiperidyl, morpholine, thiamorpholine, piperazine and 1,3,5-dithiazine and must not otherwise contain any element except hydrogen and carbon, in other words, each free valence of each carbon atom which is a member of the ring will be satisfied by a hydrogen or an alkyl group solely. The term "heterocyclic imine" is employed in its strict sense to mean a heterocyclic compound in which the nitrogen is a member of the ring having 2 valences satisfied by 2 other members of the ring and having its third valence satisfied by hydrogen only. Also, the term "saturated" heterocyclic imine is used in its common and strict sense to mean that no two elements are bonded together by multiple bonds and that each element of the compound is bonded to one or more other elements by single bonds only. Representative saturated heterocyclic imines within such class are:

Piperidine
Pyrrolidine
α-Pipecoline
Dipiperidyls
Morpholine
Thiamorpholine
Piperazine
Thialdine I have found that saturated heterocyclic imines containing a piperidine or pyrrolidine nucleus are most effective and are preferred. Such imines are those containing a heterocyclic ring the members of which consist of one nitrogen atom and 4 to 5 carbon atoms and which, except for the nitrogen atom that is a member of the heterocyclic ring, consist of carbon and hydrogen atoms. A particularly preferred class of heterocyclic imines consists of piperidine and derivatives thereof in which one or more of the hydrogen atoms on the carbon members of the ring have been replaced by alkyl groups. This latter class may be otherwise defined as saturated heterocyclic imines containing a heterocyclic ring the mmebers of which consist of one nitrogen atom and 5 carbon atoms and which imines, except for the nitrogen atom that is a member of the heterocyclic ring, consist of carbon and hydrogen atoms.

The heterocyclic imine may be added to the N,N'-di-(sec.-butyl)-p-phenylenediamine in a proportion of from at least 0.1% by weight. In general, satisfactory results will be obtained with from about 0.2% to about 5% of the imine. Very much larger proportions of imine may be employed if desired. Fifty per cent has been found to be very effective, but substantially more than 5% is usually unnecessary, increases the cost of the composition and unduly dilutes the N,N'-di-(sec.-butyl)-p-phenylenediamine. However, such larger amounts may be desirable when the N,N'-di-(sec.-butyl)-p-phenylenediamine contains an unusually large amount of impurities. Preferably, I employ the heterocyclic imines in the proportion of from about 0.5% to about 2% by weight based on the N,N'-di-(sec.-butyl)-p-phenylenediamine.

The compositions of my invention may be made in any desired manner. The heterocyclic imine may be added to the N,N'-di-(sec.-butyl)-p-phenylenediamine and the two distilled together under vacuum. Preferably, however, the heterocyclic imine is added to freshly distilled N,N'-di-(sec.-butyl)-p-phenylenediamine and the materials mixed together by stirring.

In order to more clearly illustrate my invention, preferred modes of carrying the same into effect and the advantageous results to be obtained thereby, the following examples are given, in which the proportions are by weight except where otherwise specifically stated:

EXAMPLE 1

Commercial N,N'-di-(sec.-butyl)-p-phenylenediamine, which was prepared by hydrogenating a mixture of p-nitroaniline and methyl ethyl ketone and which had been freshly distilled under vacuum, was subjected alone, and together with various concentrations ranging from 0.1% to 5% by weight of piperidine, to a greatly accelerated stability test which consisted in exposing the samples in 4-ounce oil sample bottles to bright direct sunlight and air. The color of each sample was taken at the start of the test and hourly thereafter, using the method of testing color of petroleum products by means of the A. S. T. M. Union Colorimeter (A. S. T. M. Designation D 155–45T). In this method, a National Petroleum Association Color Number (N. P. A.) is obtained by determining the glass color standard which most nearly matches the color of the sample under examination. These color numbers range from 1 ("lily white") to 8 ("very dark red"). The following results were obtained in this accelerated aging test for stability of the various samples.

*Table 1*

| Percent Piperidine Added to N,N'-Di-(sec.-butyl)-p-Phenylenediamine. | N. P. A. Color After Number of Hours Shown | | | | | | | |
|---|---|---|---|---|---|---|---|---|
|  | 0 | 1 | 2 | 3 | 4 | 5 | 6 | 7 |
| 0.0 | 4½ | 5 | 6 | 7 | 8 | | | |
| 0.1 | 4½ | 5 | 5 | 6 | 6 | 6 | 7 | 7 |
| 0.2 | 4½ | 4½ | 4½ | 5 | 5 | 5 | 6 | 6 |
| 0.5 | 4½ | 4½ | 4½ | 4½ | 5 | 5 | 5 | 6 |
| 1.0 | 4½ | 4½ | 4½ | 4½ | 4½ | 4½ | 5 | 5 |
| 2.0 | 4½ | 4½ | 4½ | 4½ | 4½ | 4½ | 4½ | 5 |
| 5.0 | 4½ | 4½ | 4½ | 4½ | 4½ | 4½ | 4½ | 4½ |

It is apparent from these data that piperidine has a remarkable stabilizing effect on N,N'-di-(sec.-butyl)-p-phenylenediamine. Since the color degradation of this product is greatly accelerated by light and air, the times of the tests are equivalent to much longer periods of storage under normal commercial conditions.

EXAMPLE 2

Samples of freshly distilled N,N'-di-(sec.-butyl)-p-phenylenediamine, made by the reductive alkylation of p-nitroaniline in an excess of methyl ethyl ketone, were aged alone and together with 0.5% by weight of different organic nitrogen bases. The accelerated stability test consisted of exposing the samples in clear glass 4-ounce sample bottles to diffused light and oxygen. Visual color comparisons were made daily for fourteen days. Some of the bases and the observed effectiveness, are given in Table 2.

*Table 2*

| N,N'-Di-(sec.-butyl)-p-Phenylenediamine+0.5% the Following Amine— | Color at End of 14 Days' Accel. Aging Period | Effectiveness of Additive in Preventing Color Development |
|---|---|---|
| None—control | Very dark red |  |
| Isopropylamine | ----do---- | Not effective. |
| Di-n-butylamine | ----do---- | Do. |
| Tri-n-butylamine | ----do---- | Do. |
| Dicyclohexylamine | ----do---- | Do. |
| Aniline | ----do---- | Do. |
| Pyrrole | ----do---- | Do. |
| Pyridine | ----do---- | Do. |
| α-Picoline | ----do---- | Do. |
| Piperidine | Light brown | Very good. |
| Pyrrolidine | ----do---- | Do. |
| Dipiperidyl (mixed)[1] | Light red | Good. |
| α-Pipecoline | ----do---- | Do. |
| Morpholine | ----do---- | Do. |
| Piperazine | ----do---- | Do. |
| Thialdine | ----do---- | Do. |

[1] This is a mixture of isomeric dipiperidyls.

All samples were pale yellow at the beginning of the stability test. The control sample and the samples containing isopropylamine, di-n-butylamine, tri-n-butylamine, dicyclohexylamine, aniline, pyrrole, α-picoline and pyridine all developed color at about the same rates and all were very dark red and had the appearance of containing finely divided solid matter at the end of the two weeks aging period. The samples, containing piperidine and pyrrolidine, were light brown and clear, and the samples, containing dipiperidyl, α-pipecoline, morpholine, piperazine and thialdine, were all light red in color and clear at the end of the accelerated test period.

EXAMPLE 3

A sample of freshly distilled N,N'-di-(sec.-butyl)-p-phenylenediamine, made by the reductive alkylation of p-nitro-aniline in methylethylketone, was divided into two portions. One portion was treated with 0.5 weight per cent of piperidine and the other portion was left untreated. Samples of both the treated and untreated phenylenediamine were exposed in clear glass bottles to ultra-violet light for 8 hours. At the beginning of this experiment, the colors of the samples were essentially identical, but after 1 hour exposure the untreated sample failed to pass the color specification for freshly distilled N,N'-di-(sec.-butyl)-p-phenylenediamine and after 8 hours it was very red in color. The treated sample passed the color specification for freshly distilled N,N'-di-(sec.-butyl)-p-phenylenediamine after the 8 hours exposure test.

Solutions of the treated and untreated N,N'-di-(sec.-butyl)-p-phenylenediamine were prepared in straight run gasoline. The solutions were exposed in clear glass bottles to ultra-violet light for 12 hours. Saybolt color readings were made on the samples to follow the color changes. The Saybolt color is described in A. S. T. M. D-156-38. The color scale goes from +30 (water white) to −16 (dark yellow). The following results were obtained:

|  | Saybolt color after exposure to ultra-violet light | | |
|---|---|---|---|
|  | orig. | 4 hrs. | 12 hrs. |
| Gasoline | +30 | +14 | +5 |
| Gasoline+.1% treated sample | +30 | +14 | −15 |
| Gasoline+.1% untreated sample | +30 | +13 | −15 |

Color stability comparisons were made between samples of thermal cracked gasoline containing 0.1 weight per cent of the above described treated and untreated N,N'-di-(sec.-butyl)-p-phenylenediamine.

The thermal cracked gasoline solutions of the two samples were stored at room temperature in clear glass bottles in diffused light, and Saybolt color readings were made to follow the color changes. The results were as follows:

|  | Saybolt color after room temp. storage | | | | |
|---|---|---|---|---|---|
|  | orig. | 2 days | 5 days | 8 days | 12 days |
| Gasoline (control) | −3 | −3 | −10 | −13 | −15 |
| Gasoline+.1% treated sample | −3 | −4 | −13 | −15 | −16 |
| Gasoline+.1% untreated sample | −3 | −5 | −13 | −15 | −16 |

It will be understood that the preceding examples are given for illustrative purposes solely and that my invention is not limited to the specific embodiments disclosed therein. The heterocyclic imines and the proportions thereof may be varied within the limits hereinbefore set forth without departing from the spirit or scope of my invention.

It will be apparent that my invention constitutes a valuable contribution to the art. The heterocyclic imines of my invention are of unpredictable special utility in inhibiting the deterioration and formation of color in commercial N,N'-di-(sec.-butyl)-p-phenylenediamine and prevent the formation of gasoline insoluble solid products therein. Thus, the compositions of my invention show remarkable resistance to deterioration and discoloration during storage, and particularly on exposure to heat, light and air, so that, when the compositions are added to gasoline, they do not introduce coloring matter to interfere with the desired colors employed to designate various grades of gasoline or form materials which will deposit in the induction systems of engines. Furthermore, the N,N'-di-(sec.-butyl)-p-phenylenediamine does not lose any of its gum inhibiting efficiency and retains its gasoline solubility during normal storage, shipping and like handling operations prior to its addition to gasoline.

I claim:
1. A composition consisting essentially of N,N'-di-(sec.-butyl)-p-phenylenediamine, which has been made by a reductive alkylation process followed by vacuum distillation and which contains a small proportion of difficultly separable impurities formed in such process that normally tend to cause discoloration upon exposure to air and light, and from about 0.2% to about 5% of a saturated heterocyclic imine of the class consist- ing of pyrrolidine, piperidine, dipiperidyl, morpholine, thiamorpholine, piperazine, 1,3,5-dithiazine, and such imines containing methyl radical substituents on the imine ring, and which imine, except for the nitrogen, oxygen and sulfur atoms that are members of the heterocyclic ring, consists of carbon and hydrogen atoms.

2. A composition consisting essentially of N,N'-di-(sec.-butyl)-p-phenylenediamine, which has been made by a reductive alkylation process followed by vacuum distillation and which contains a small proportion of difficultly separable impurities formed in such process that normally tend to cause discoloration upon exposure to air and light, and from about 0.2% to about 5% of a saturated heterocyclic imine containing only 1 cyclic ring which ring is a heterocyclic ring the members of which consist of 1 nitrogen atom and 4 to 5 carbon atoms and which imine, except for the nitrogen atom that is a member of the heterocyclic ring, consists of 4 to 6 carbon atoms and hydrogen atoms.

3. A composition consisting essentially of N,N'-di-(sec.-butyl)-p-phenylenediamine, which has been made by a reductive alkylation process followed by vacuum distillation and which contains a small proportion of difficultly separable impurities formed in such process that normally tend to cause discoloration upon exposure to air and light, and from about 0.2% to about 5% of a saturated heterocyclic imine containing only 1 cyclic ring which ring is a piperidine ring and which imine, except for the nitrogen atom that is a member of the piperidine ring, consists of 5 to 6 carbon atoms and hydrogen atoms.

4. A composition consisting essentially of N,N'-di-(sec.-butyl)-p-phenylenediamine, which has been made by a reductive alkylation process followed by vacuum distillation and which contains a small proportion of difficultly separable impurities formed in such process that normally tend to cause discoloration upon exposure to air and light, and from about 0.2% to about 5% of piperidine.

5. A composition consisting essentially of N,N'-di-(sec.-butyl)-p-phenylenediamine, which has been made by a reductive alkylation process followed by vacuum distillation and which contains a small proportion of difficultly separable impurities formed in such process that normally tend to cause discoloration upon exposure to air and light, and from about 0.2% to about 5% of pyrrolidine.

6. A composition consisting essentially of N,N'-di-(sec.-butyl)-p-phenylenediamine, which has been made by a reductive alkylation process followed by vacuum distillation and which contains a small proportion of difficultly separable impurities formed in such process that normally tend to cause discoloration upon exposure to air and light, and from about 0.2% to about 5% of morpholine.

7. A composition consisting essentially of N,N'-di-(sec.-butyl)-p-phenylenediamine, which has been made by a reductive alkylation process followed by vacuum distillation and which contains a small proportion of difficultly separable impurities formed in such process that normally tend to cause discoloration upon exposure to air and light, and from about 0.5% to about 2% of a saturated heterocyclic imine of the class consisting of pyrrolidine, piperidine, dipiperidyl, morpholine, thiamorpholine, piperazine, 1,3,5-dithiazine, and such imines containing methyl radical substituents on the imine ring, and which imine, except for the nitrogen, oxygen and sulfur atoms that are members of the heterocyclic ring, consists of carbon and hydrogen atoms.

8. A composition consisting essentially of N,N'-di-(sec.-butyl)-p-phenylenediamine, which has been made by a reductive alkylation process followed by vacuum distillation and which contains a small proportion of difficultly separable impurities formed in such process that normally tend to cause discoloration upon exposure to air and light, and from about 0.5% to about 2% of a saturated heterocyclic imine containing only 1 cyclic ring which ring is a heterocyclic ring the members of which consist of 1 nitrogen atom and 4 to 5 carbon atoms and which imine, except for the nitrogen atom that is a member of the heterocyclic ring, consists of 4 to 6 carbon atoms and hydrogen atoms.

9. A composition consisting essentially of N,N'-di-(sec.-butyl)-p-phenylenediamine, which has been made by a reductive alkylation process followed by vacuum distillation and which contains a small proportion of difficultly separable impurities formed in such process that normally tend to cause discoloration upon exposure to air and light, and from about 0.5% to about 2% of a saturated heterocyclic imine containing only 1 cyclic ring which ring is a piperidine ring and which imine, except for the nitrogen atom that is a member of the piperidine ring, consists of 5 to 6 carbon atoms and hydrogen atoms.

10. A composition consisting essentially of N,N'-di-(sec.-butyl)-p-phenylenediamine, which has been made by a reductive alkylation process followed by vacuum distillation and which contains a small proportion of difficultly separable impurities formed in such process that normally tend to cause discoloration upon exposure to air and light, and from about 0.5% to about 2% of piperidine.

11. A composition consisting essentially of N,N'-di-(sec.-butyl)-p-phenylenediamine, which has been made by a reductive alkylation process followed by vacuum distillation and which contains a small proportion of difficultly separable impurities formed in such process that normally tend to cause discoloration upon exposure to air and light, and from about 0.5% to about 2% of pyrrolidine.

12. A composition consisting essentially of N,N'-di-(sec.-butyl)-p-phenylenediamine, which has been made by a reductive alkylation process followed by vacuum distillation and which contains a small proportion of difficultly separable impurities formed in such process that normally tend to cause discoloration upon exposure to air and light, and from about 0.5% to about 2% of morpholine.

CHARLES B. BISWELL.

REFERENCES CITED

The following references are of record in the file of this patent:

UNITED STATES PATENTS

| Number | Name | Date |
| --- | --- | --- |
| 2,150,832 | Hinman et al. | Mar. 14, 1939 |
| 2,363,778 | Pederson | Nov. 28, 1944 |
| 2,461,917 | Orelup | Feb. 15, 1949 |
| 2,512,297 | Biswell et al. | June 20, 1950 |